(12) United States Patent
Ohura

(10) Patent No.: US 6,428,191 B2
(45) Date of Patent: Aug. 6, 2002

(54) ILLUMINATOR IN STORAGE BOX OF MOTORCYCLE

(75) Inventor: Kousei Ohura, Hamamatsu (JP)

(73) Assignee: Suzuki Motor Corporation, Shizuoka-ken (JP)

( * ) Notice: Subject to any disclaimer, the term of this patent is extended or adjusted under 35 U.S.C. 154(b) by 0 days.

(21) Appl. No.: 09/870,864

(22) Filed: May 30, 2001

(30) Foreign Application Priority Data

Jun. 23, 2000 (JP) ........................................ 2000-189992

(51) Int. Cl.$^7$ ................................................. B62J 7/00
(52) U.S. Cl. ........................ 362/473; 362/496; 362/154; 362/483; 362/488; 362/155; 362/156
(58) Field of Search ................................ 362/473, 496, 362/154, 483, 488, 155, 156

(56) References Cited

U.S. PATENT DOCUMENTS

| 4,310,872 A | * | 1/1982 | Lauve | 362/82 |
| 4,621,308 A | * | 11/1986 | Holmberg et al. | 362/154 |
| 5,127,560 A | * | 7/1992 | Miyamoto et al. | 224/32 R |
| 5,147,077 A | * | 9/1992 | Nakajima et al. | 224/32 R |
| 5,439,071 A | * | 8/1995 | Rodriguez-Ferre | 180/67 |
| 5,580,153 A | * | 12/1996 | Motz | 362/80 |
| 6,086,131 A | * | 7/2000 | Bingle et al. | 296/76 |
| 6,254,251 B1 | * | 7/2001 | Washington | 362/154 |

FOREIGN PATENT DOCUMENTS

| JP | 2-37640 | 10/1990 | ............ B60Q/3/06 |
| JP | 6-156345 | 6/1994 | |

* cited by examiner

Primary Examiner—Sandra O'Shea
Assistant Examiner—Anabel Ton
(74) Attorney, Agent, or Firm—Darby & Darby

(57) ABSTRACT

A storage box illuminator for a motorcycle in which a storage box having a top opening is arranged under the seat so that the bottom plate of the seat can cover the opening in an openable and closable manner is so configured that an illuminating lamp is arranged inside a depressed portion which is formed on the underside of the seat bottom plate of the seat and indented upward approximately as deep as the height of the illuminating device so that the illuminating lamp can illuminate the inside of the storage box when the seat is set open.

4 Claims, 9 Drawing Sheets

ILLUMINATOR IN STORAGE BOX OF MOTORCYCLE

BACKGROUND OF THE INVENTION (1) Field of the Invention

The present invention relates to a storage box under the seat of a motorcycle, and in particular relates to a storage box illuminator and the wiring arrangement therefor.

(2) Description of the Prior Art

Some recent motorcycles have a storage box which is arranged under an openable seat to accommodate helmets and small luggage.

Of these, some known storage boxes are provided with an illuminator on the side wall thereof for use at night.

A conventional storage box 103, as shown in FIG. 1, is arranged under seat 102 attached to the bodywork frame, designated at 6, in the rear of the motorcycle, and forms its storage portion with the underside of the seat as a lid.

The seat 102 has a seat hinge portion 18 at the front end thereof with respect to the motorcycle's travelling direction while one end of a gas damper 25 is attached to the approximately center of the seat. The other end of this gas damper is engaged with bodywork frame 6 so that the seat can open upward pivoting about the seat hinge portion 18.

The storage box 103 is arranged over bodywork frame 6 extended to the rear and has an illuminating lamp 104 on its interior wall on the front side with respect to the motorcycle's travelling direction.

Thus, this arrangement makes it possible to reliably keep luggage 30 in the storage box and enables the user to put the luggage in and take out at night with the help of illuminating lamp 104.

However, in this conventional storage box, when a piece of luggage is put the luggage may shade the illuminating lamp so that it cannot illuminate the inside of the storage box.

SUMMARY OF THE INVENTION

In view of the above problem, it is therefore an object of the present invention to provide an illuminator in the storage box of a motorcycle which is able to illuminate the inside of the storage box without being shaded by the luggage therein.

The present invention has been devised to attain the above object and is configured as follows:

In accordance with the first aspect of the present invention, a storage box illuminator for a motorcycle in which a storage box having a top opening is arranged under the seat so that the bottom plate of the seat can cover the opening in an openable and closable manner, includes: an illuminating device for illuminating the inside of the storage box; and a depressed portion which is formed on the underside of the seat bottom plate of the seat and indented upward approximately as deep as the height of the illuminating device, and is characterized in that the illuminating device is arranged inside the depressed portion so that the illuminating device can illuminate the inside of the storage box when the seat is set open.

In accordance with the second aspect of the present invention, the storage box illuminator for a motorcycle having the above first feature further includes: wiring cord holders provided on the undersurface of the seat bottom plate for leading the wiring cord from the illuminating device to the outside of the storage box; and a sealing element arranged on the underside of the seat bottom plate opposing the opening of the storage box, and is characterized in that the wiring cord is arranged on the underside of the seat covering the storage box in an openable and closable manner and extended along the wiring cord holders, and a pair of passage holes are formed in the seat bottom plate at positions on the inner and outer sides of the opening of the storage box so that the wiring cord is arranged passing through these passage holes to bypass the sealing element.

In accordance with the third aspect of the present invention, the storage box illuminator for a motorcycle having the above first feature is characterized in that:

the seat has a seat hinge portion at the front part thereof and is supported on the bodywork by the seat hinge portion so that the seat can open and close the opening of the storage box by being pivoted vertically;

the wiring cord is arranged from the illuminating device to the power supply on the bodywork, passing by the seat hinge portion at the front part of the seat, and is comprised of a body-side wiring part extended from the power supply on the body side and a seat-side wiring part arranged from the illuminating device on the underside of the seat bottom plate along the seat bottom plate so that they can be joined and disjoined at a joining portion; and the joining portion between the body-side wiring part and seat-side wiring part of the wiring cord is disposed at the seat hinge portion on the bodywork side.

In accordance with the fourth aspect of the present invention, the storage box illuminator for a motorcycle having the above second feature is characterized in that:

the seat has a seat hinge portion at the front part thereof and is supported on the bodywork by the seat hinge portion so that the seat can open and close the opening of the storage box by being pivoted vertically;

the wiring cord is arranged from the illuminating device to the power supply on the bodywork, passing by the seat hinge portion at the front part of the seat, and is comprised of a body-side wiring part extended from the power supply on the body side and a seat-side wiring part arranged from the illuminating device on the underside of the seat bottom plate along the seat bottom plate so that they can be joined and disjoined at a joining portion; and the joining portion between the body-side wiring part and seat-side wiring part of the wiring cord is disposed at the seat hinge portion on the bodywork side.

According to the present invention, since the depressed portion is formed on the underside of the seat bottom plate and indented upward approximately as deep as the height of the illuminating device, the illuminating device is able to illuminate the inside of the storage box without its being shaded by the luggage therein. Further, since the illuminating lamp will not come into contact with the luggage kept inside the storage box, the illuminating lamp will not be damaged.

Since the wiring cord to the illuminating device is arranged on the underside of the seat covering the opening of the storage box in an openable and closable manner, along the wiring cord holders provided on the undersurface of the seat bottom plate to be extended to the outside of the storage box, it is possible to replace the electric interconnection and cord without disassembling the seat, hence leading to improvement in working efficiency. Further, in a storage box having a sealing element provided along the periphery of the opening opposing the seat bottom plate, since passage holes are formed in the seat bottom plate at positions on the inner and outer sides of the opening of the storage box so that the wiring cord is arranged passing through these passage holes to bypass the sealing element, it is possible to create electric interconnection without any loss of sealability of the storage box.

Since multiple wiring cord holders for guiding the cord are arranged on the seat bottom plate, it is possible to hold the cord with a simple and inexpensive structure, without the necessity of providing any fastening components separate from the seat bottom plate.

Further, in a configuration in which the seat has a seat hinge portion at the front part thereof and is supported on engaged with the bodywork by the seat hinge portion so that the seat can open and close the opening of the storage box by being pivoted vertically, the wiring cord is arranged from the illuminating device to the power supply on the bodywork passing by the seat hinge portion at the front part of the seat, and is comprised of a body-side wiring part extended from the power supply on the body side and a seat-side wiring part arranged from the illuminating device on the underside of the seat bottom plate along the seat bottom plate so that they can be joined and disjoined at a joining portion as the seat is attached to and detached from the bodywork. Therefore, the interconnection can be easily assembled into and disassembled from the bodywork. Further, since the interconnection can be assembled and disassembled with the illuminating lamp mounted, this configuration contributes to improvement in the working efficiency and maintenance.

The joining portion is larger in size yet lower in strength compared to the other wiring components. The arrangement of the joining portion at an accessible site such as a position on the bodywork frame, etc., near the seat hinge portion provides reliable attachment, which can be made with a simple structure compared to its attachment to the seat bottom plate.

DESCRIPTION OF THE PREFERRED EMBODIMENTS

The embodiment of the present invention will hereinafter be described in detail with reference to the accompanying drawings.

Figure 1:
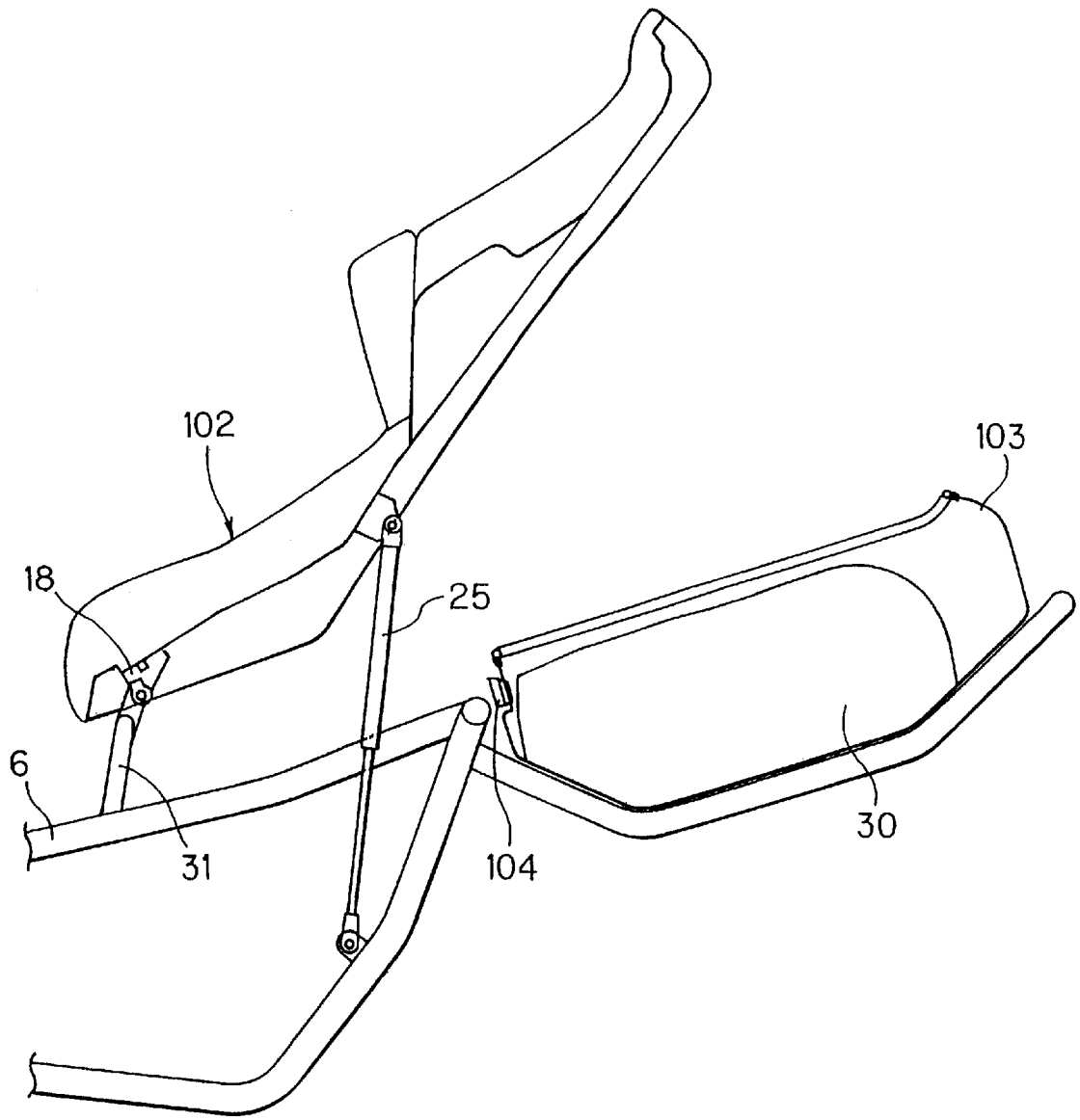
FIG. 1 is a schematic view showing a conventional seat arrangement with its seat open.
Figure 2:
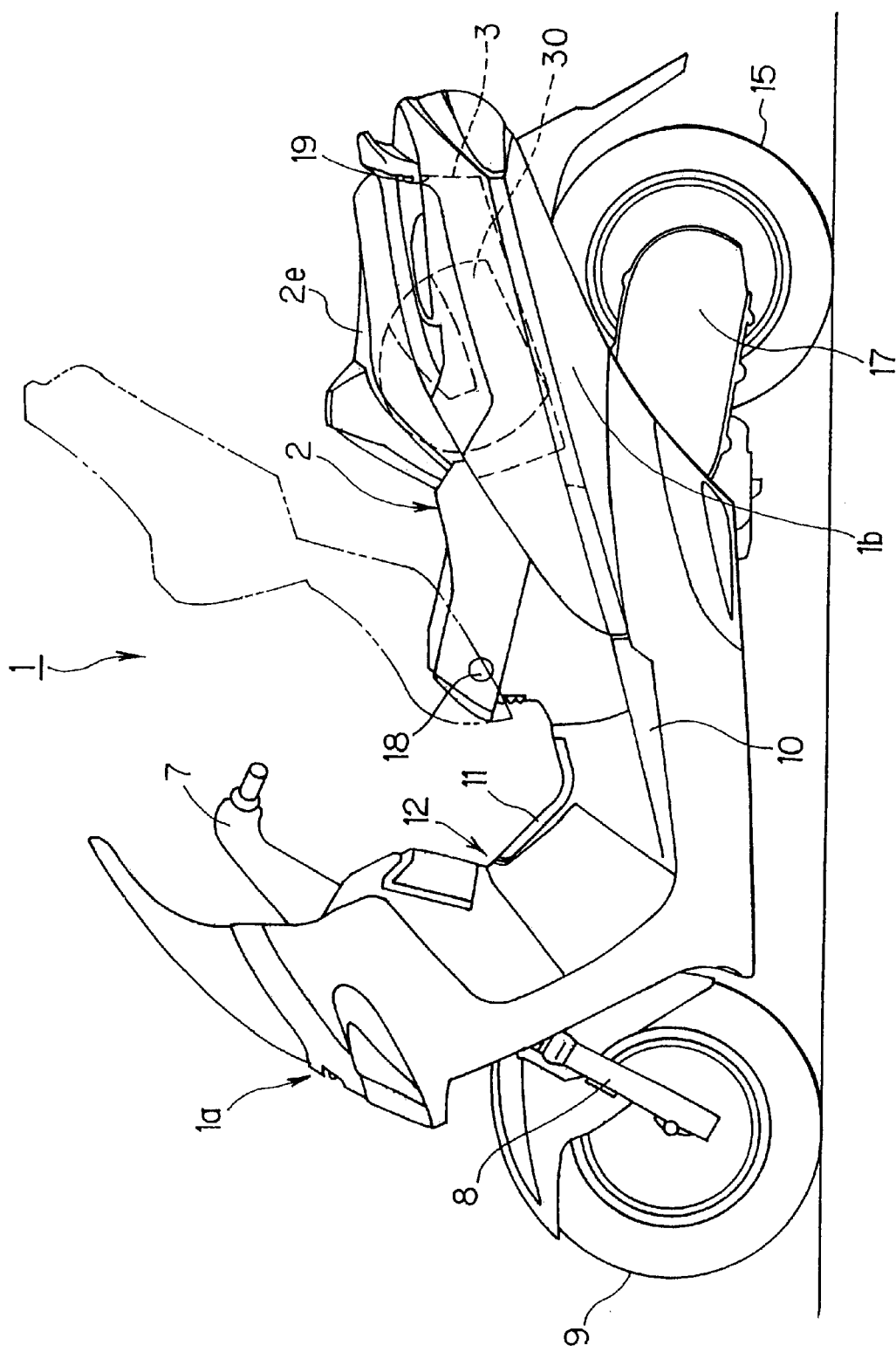
FIG. 2 is an illustrative view showing the overall configuration of a scooter type motorcycle having a seat arrangement according to the embodiment of the present invention.
Figure 3:
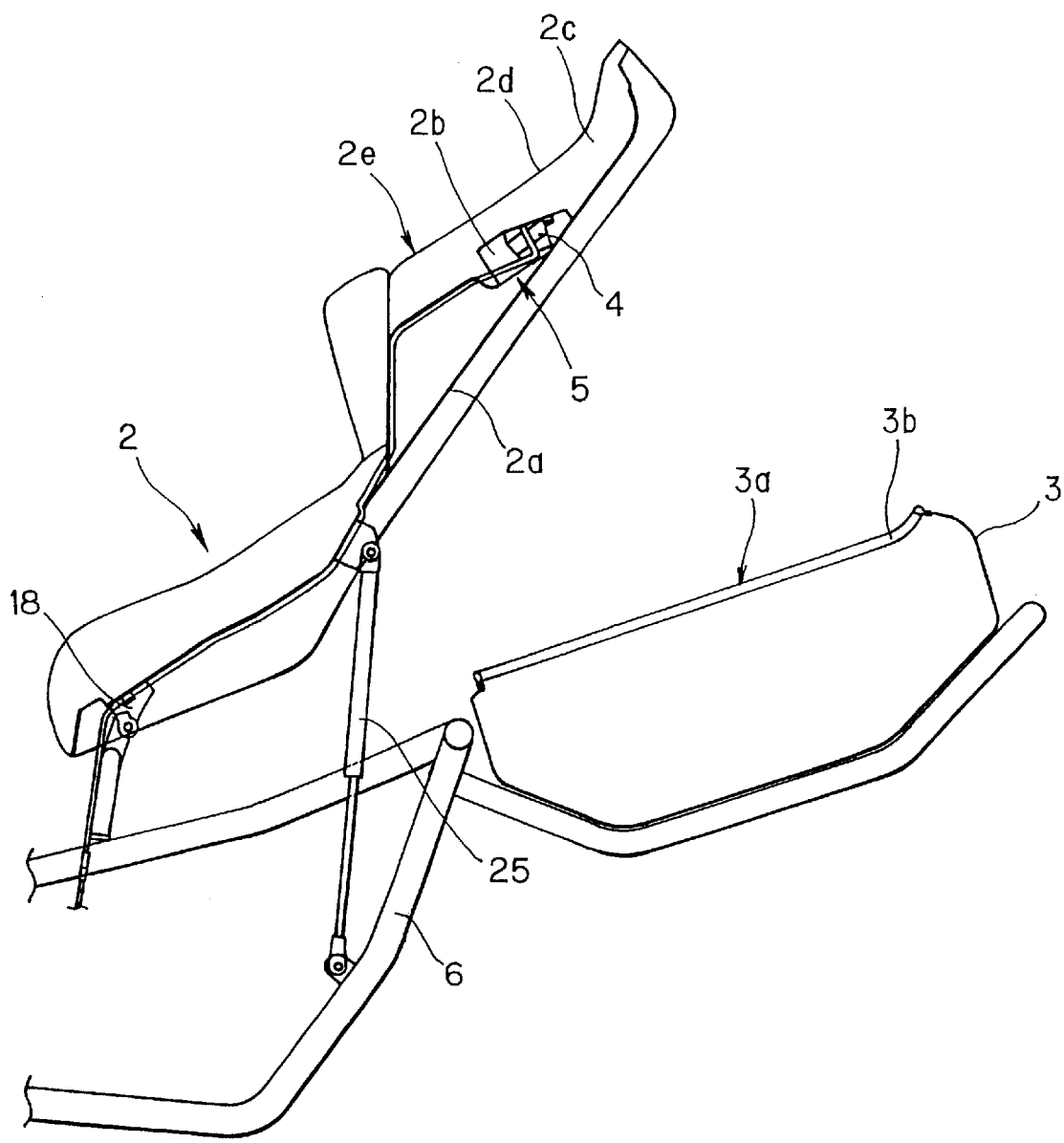
FIG. 3 is a schematic view showing the seat arrangement with its seat open.
Figure 4:
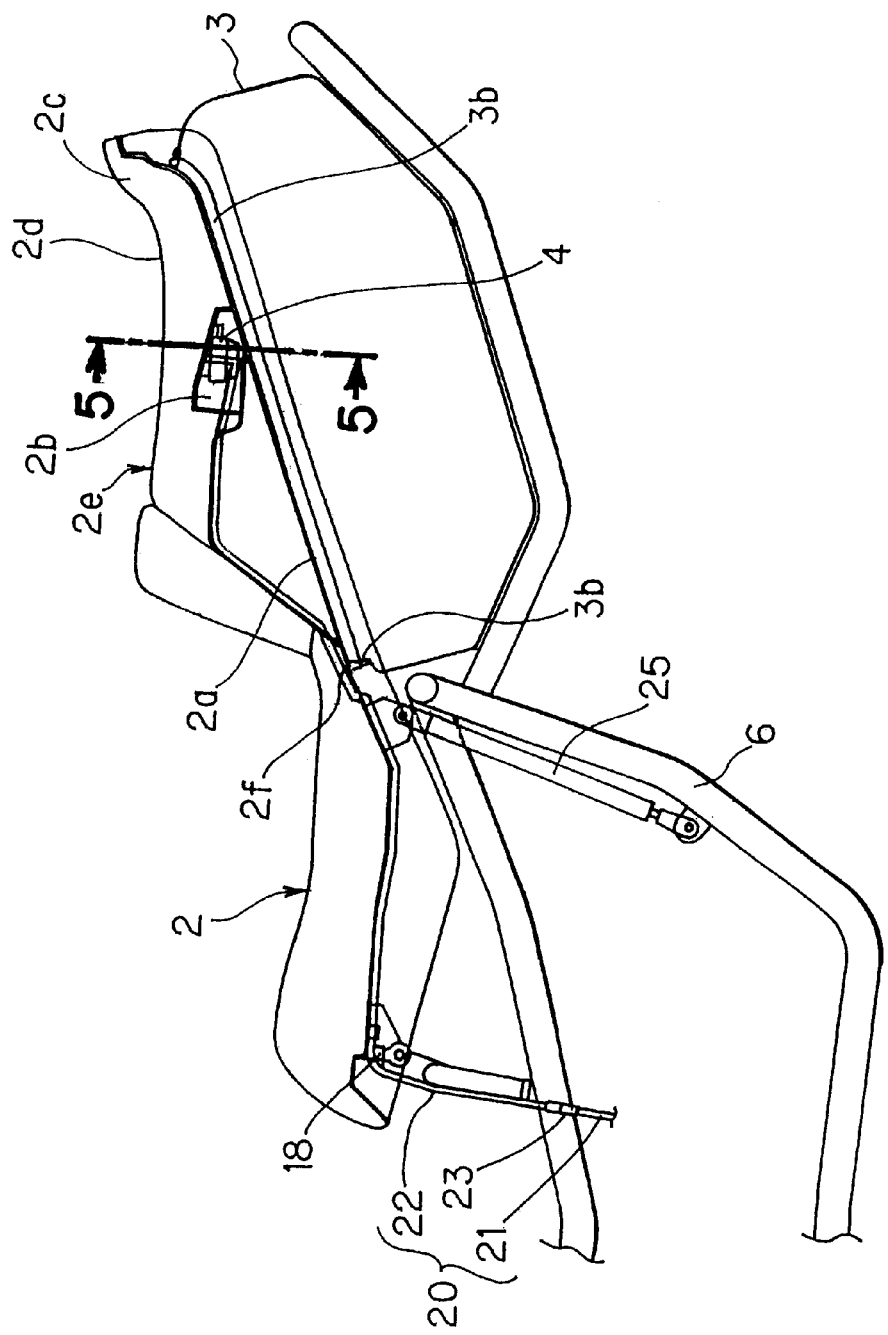
FIG. 4 is a schematic view showing the seat arrangement with its seat closed.
Figure 5:
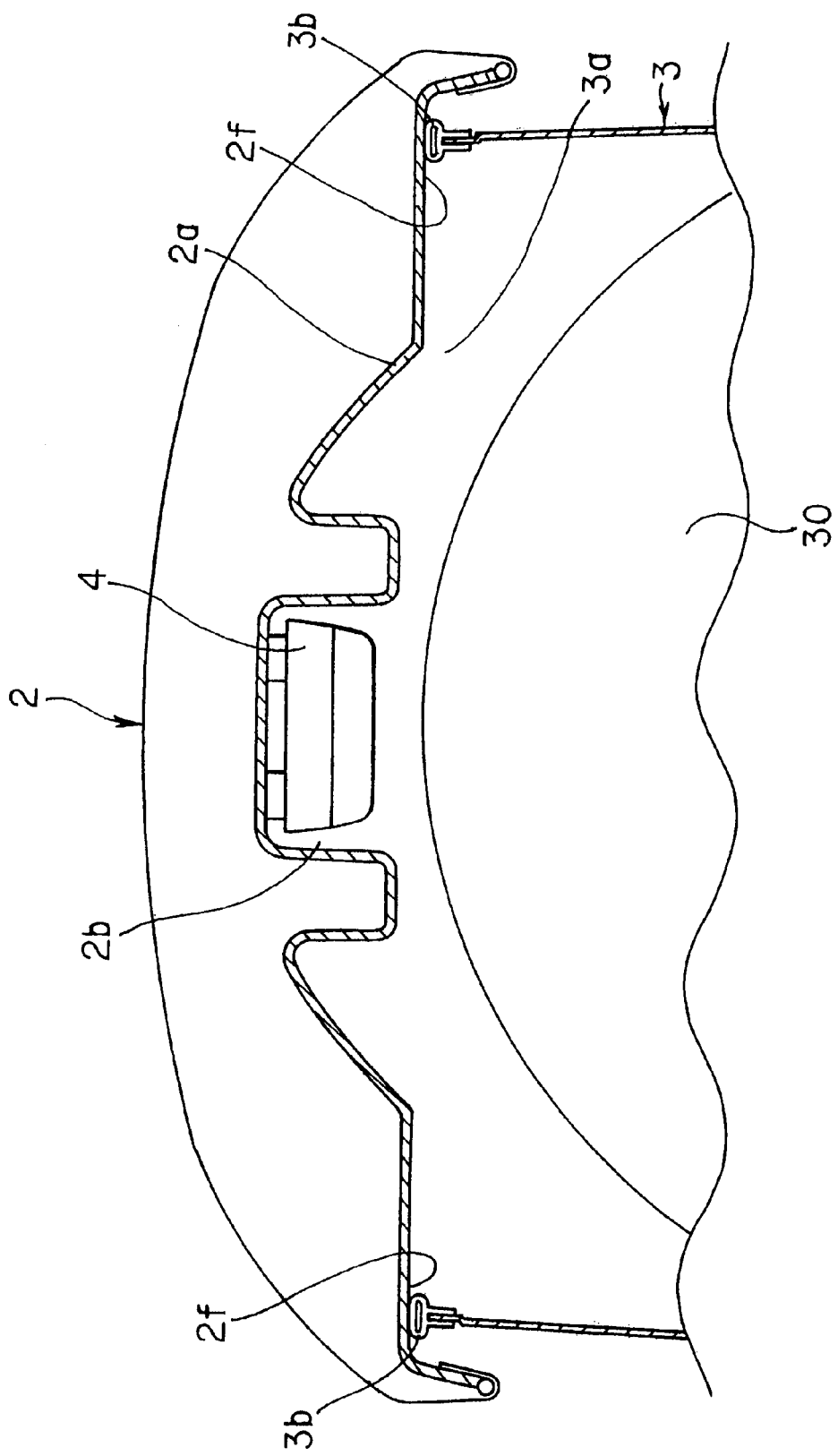
FIG. 5 is a detailed sectional view taken along a plane A—A in FIG.4 showing the structure of an illuminator being attached according to the embodiment.
Figure 6:
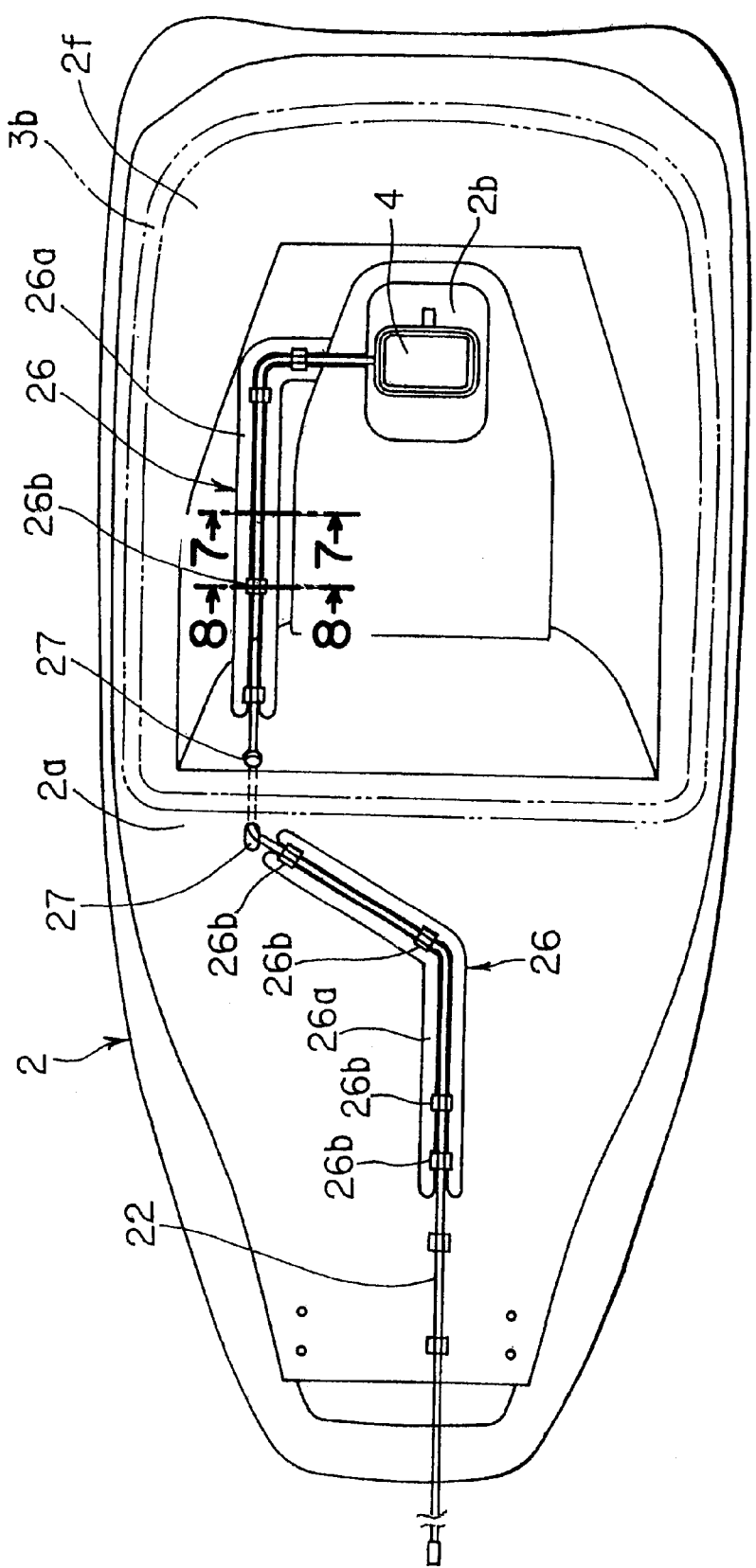
FIG. 6 is a bottom view showing the seat arrangement.
Figure 7:
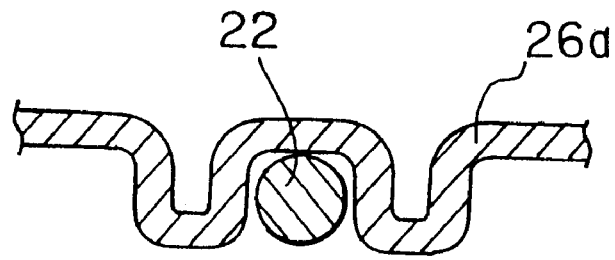
FIG. 7 is a detailed sectional view showing the seat bottom plate taken along a plane B—B in FIG. 6.
Figure 8:
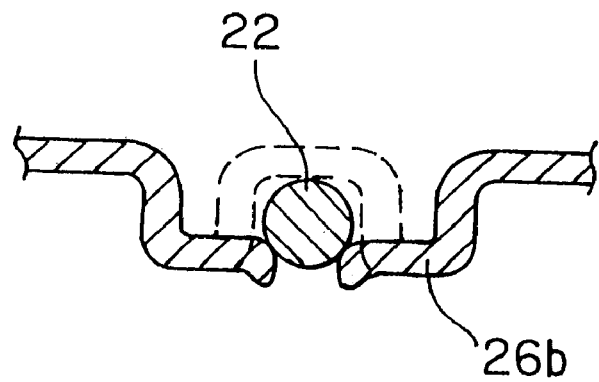
FIG. 8 is a detailed sectional view showing the seat bottom plate taken along a plane C—C in FIG. 6.
Figure 9:
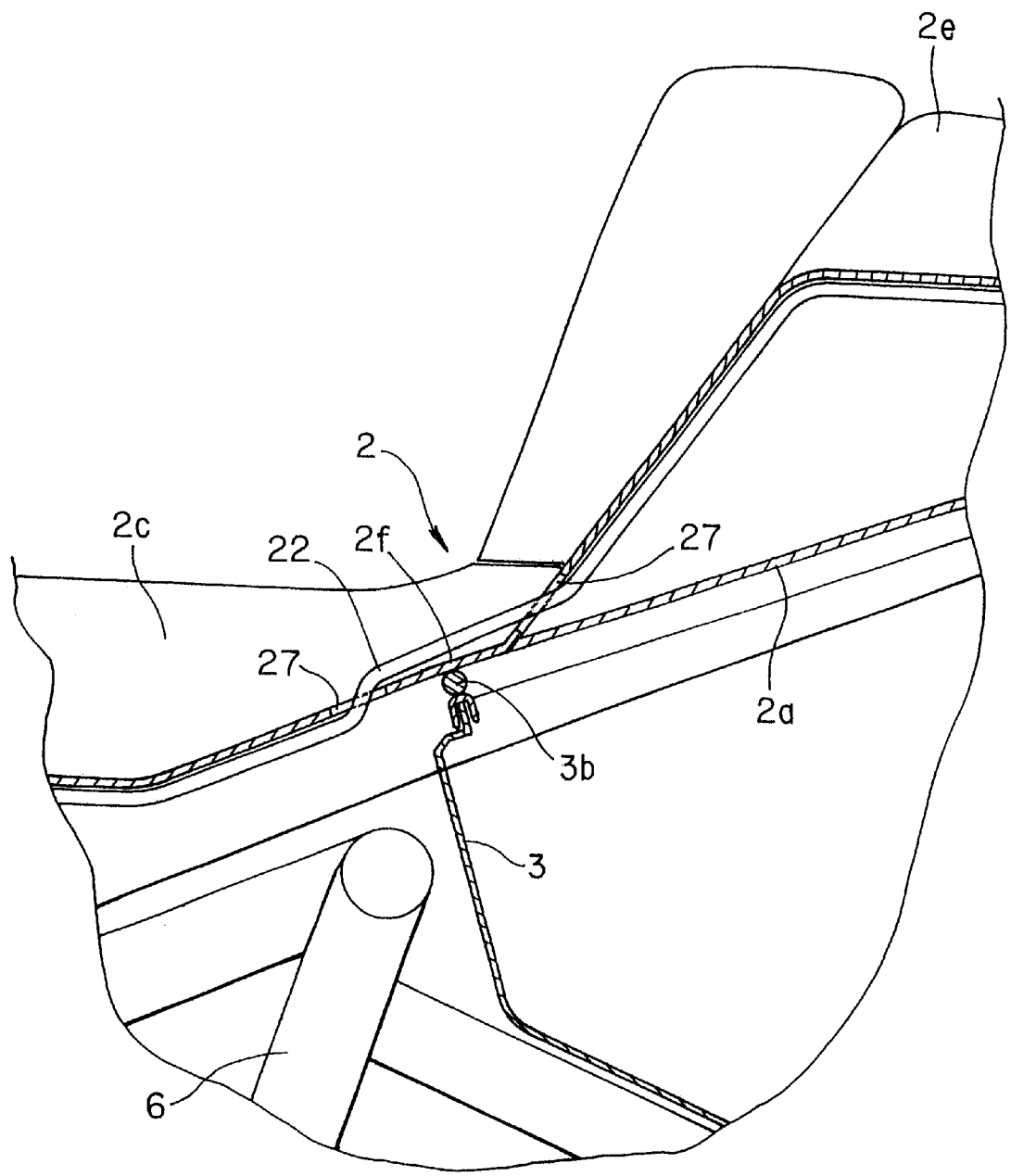
FIG. 9 is an enlarged view showing the configuration of the seat structure near the seat portion.
Figure 10:
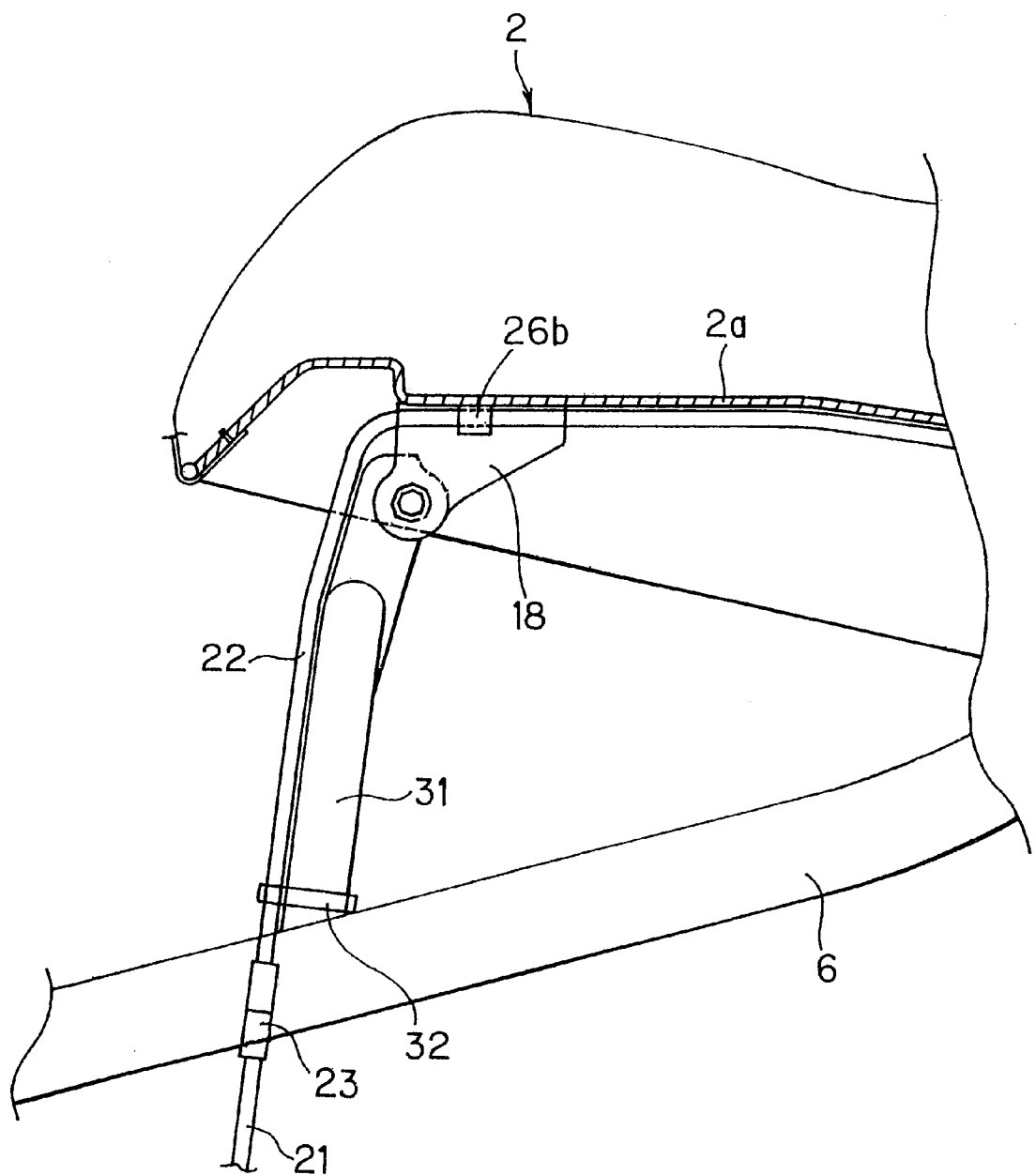
FIG. 10 is an enlarged view showing the configuration of the seat near the seat hinge portion.

FIG. 2 is an illustrative view showing the overall configuration of a scooter type motorcycle having a seat arrangement according to the embodiment of the present invention. FIG. 3 is a schematic view showing the seat arrangement with its seat open. FIG. 4 is a schematic view showing the seat arrangement with its seat closed. FIG. 5 is a sectional showing the structure of an illuminator being attached according to the embodiment. FIG. 6 is a bottom view showing the seat arrangement. FIG. 7 is a detailed sectional view showing the seat bottom plate taken along a plane B—B in FIG. 6. FIG. 8 is a detailed sectional view showing the seat bottom plate taken along a plane C—C in FIG. 6. FIG. 9 is an enlarged view showing the configuration of the seat structure near the seat portion. FIG. 10 is an enlarged view showing the configuration of the seat near the seat hinge portion.

This embodiment is a storage box illuminator 5 for a motorcycle 1 in which a storage box 3 having a top opening 3a is arranged under a seat 2 so that the bottom plate 2a of the seat can cover the opening in an openable and closable manner. This illuminator 5 includes: an illuminating lamp 4 as an illuminating means for illuminating the inside of the storage box 3; and a depressed portion 2b which is formed on the underside of seat bottom plate 2a of the seat 2 and indented upward approximately as deep as the height of the illuminating lamp 4. The illuminating lamp 4 is arranged inside the depressed portion 2b so that the illuminating lamp 4 can illuminate the inside of the storage box 3 when seat 2 is set open.

As shown in FIG. 2, motorcycle 1 is a two-seater large-sized scooter type Motorcycle. In the front body 1a, a pair of handlebars 7 are supported by a bodywork frame 6 and a front fork 8 which rotatably supports a front wheel 9 is arranged below and coupled with the handle bars 7. A seat 2 is arranged in the rear of the front body 1a. Formed between this front body 1a and seat 2 is a floor portion 12, which is composed of a pair of plate-like footboards 10 arranged on the left and right with respect to the motorcycle's travelling direction for allowing the rider straddling the seat 2 to rest their feet thereon and a center console 11 which rises forming a ridge between these foot boards 10.

Provided in the rear of floor portion 12 is a rear cover 1b covering the rear part of the bodywork. A unit swing type engine 17 is arranged under the rear cover. This unit swing type engine supports a rear wheel 15 vertically swayably. In this embodiment, the unit swing type engine 17 is of a four-cycle engine.

The seat 2 has a seat hinge portion 18 on its front side as shown in FIG. 3. That is, the seat is engaged with bodywork frame 6 in such a manner that the rear part of seat 2 can pivot about the seat hinge portion 18 upward and forward so as to free an opening 3a of storage box 3.

The seat 2 is a two-seater seat having a dual-seat portion 2e, under which storage box 3 is arranged. This seat 2 is pivotally supported by seat hinge portion 18 arranged on the bodywork side under the front part of the seat and is fixed by engagement with a seat lock portion 19 arranged on the bodywork side under the rear part of the seat.

As shown in FIGS. 3 and 4, the seat 2 is configured of a seat bottom plate 2a, a cushion 2c fixed to the bottom plate and a cover 2d forming the external covering. This seat 2 is supported by a gas damper 25 which is arranged between bodywork frame 6 and seat bottom plate 2a so that the center of gravity of the seat is kept in the same position as to the position before the seat is held vertical when the seat 2 is opened.

As shown in FIG. 5, the seat 2 is formed with a depressed portion 2b on the underside of seat bottom plate 2a, where an illuminating lamp 4 is arranged being enclosed by the interior faces of depressed portion 2b. The peripheral wall of this depressed portion 2b is formed approximately as high as the set height of illuminating lamp 4.

As shown in FIG. 6, a pair of passage hole 27 are formed in seat bottom plate 2a around the area opposing a sealing element 3b while a multiple number of wiring cord holders 26 are disposed along the route in which a wiring cord will be laid out.

Illuminating lamp 4 is fixed on the undersurface of seat bottom plate 2a so as to illuminate the inside of storage box 3 when seat 2 is open.

In the storage box 3, sealing element 3b is arranged along the periphery of opening 3a formed opposing seat bottom plate 2a, as shown in FIGS. 3 to 5, so as to come into contact with a seal abutment portion 2f of the bottom plate when seat 2 is closed, whereby water is prevented from entering the inside of storage box 3.

The wiring cord, designated at 20, from the illuminating lamp 4 to the power supply is comprised of a body-side wiring cord 21 extended from the power supply (not shown) and a seat-side wiring cord 22, as shown in FIGS. 6, 9 and 10. The body-side wiring cord 21 and a seat-side wiring cord 22 are detachably joined by a coupler 23 at a joining portion arranged on the body side near the seat hinge portion 18.

The seat-side wiring cord 22 is laid out along the underside of seat bottom plate 2a from illuminating lamp 4 toward the body front near to sealing element 3b and then comes out once through one passage hole 27 to the upper side of seat bottom plate 2a (along the inside of seat 2) and again sinks through another passage hole 27 to the underside of seat bottom plate 2a at a position where the seal element 3b is bypassed. This cord is further extended to the body front passing by seat hinge portion 18 and is connected to coupler 23 arranged on the bodywork side.

As shown in FIGS. 6 and 7, wiring cord holders 26 are comprised of two types, wiring cord guiding elements 26a that are projectively formed so as to case the seat-side wiring cord 22 over appropriate ranges along seat-side wiring cord 22 and wiring cord hooking elements 26b that grip wiring cord 20 at a number of positions. Thus the seat-side wiring cord 22 is held by the combination of these elements.

As shown in FIG. 10, the joining portion, or coupler 23 between body-side wiring cord 21 and seat-side wiring cord 22 is fixed to the body side by providing a fixing hook 32 on a supporter 31 for attachment of seat 2 to the body side. This coupler 23 is arranged on the non-movable side below frame 6, so as to be positioned away from the part of the cord where it is repeatedly bent and straighten when the seat is opened and closed.

In the above configuration of the wiring arrangement for storage box illuminator 5, since seat-side wiring cord 22 is arranged by providing passage holes 27 in seat bottom plate 2a so as to bypass only the necessary range taking a minimum bypass route between seat bottom plate 2a and cushion 2c, it is possible to ease the work for replacement of wiring cord 20 upon disconnection etc., as well as for maintenance.

Since seat-side wiring cord 22 is made to pass over the upper side of seat bottom plate 2a around the sealing element on the undersurface of seat bottom plate 2a opposing sealing element 3b of storage box 3, it is possible to provide reliable sealability of storage box 3 without creating any gap between seat-side wiring cord 22 and sealing element 3b.

Since wiring cord holders 26 are comprised of wiring cord guiding elements 26a and wiring cord hooking elements 26b so that these elements are formed in seat bottom plate 2a, it is possible to hold seat-side wiring cord 22 with a simple and inexpensive structure, without the necessity of providing any separate wiring cord holders.

Since wiring cord 20 is comprised of body-side wiring cord 21 and seat-side wiring cord 22 while coupler 23 as the joining portion is arranged on the bodywork frame side, avoiding the moving part where the cord is repeatedly bent and straighten, this configuration offers the advantages of avoiding disconnection of the wiring cord and breakage of coupler 23 due to repeated actions of its being bent and straighten.

In this embodiment, since depressed portion 2b which is depressed upward from the underside of seat bottom plate 2a is formed and part of the seat bottom plate 2a is projectively formed so as to enclose illuminating lamp 4 to be arranged in the depressed portion 2b, this configuration makes possible to prevent interference between illuminating lamp 4 and the stored luggage and provide a large usable space under seat bottom plate 2a. However, the present invention should not be limited to this as long as a depressed portion as deep as the height of the illuminating device is formed on the underside of seat bottom plate 21. For example, a depressed portion may be formed merely on the underside of seat bottom plate 2a.

In this case, it is possible to lay out the illuminating device on the underside of bottom plate 2a with a simple structure without causing any interference with the luggage kept inside the storage box. Further, this configuration is able to simplify the constituent parts, which leads to reduction in cost.

As has been described, according to the storage box illuminator for a motorcycle of the present invention, the illuminating device is able to illuminate the inside of the storage box without its being shaded by the luggage therein. Further, since the illuminating lamp including the wiring cord can be arranged so as not to come into contact with the luggage kept inside the storage box, the illuminating lamp and wiring cord will not be damaged.

Further, since the electric cord can be laid out by bypassing the sealed portion of the storage box, this configuration contributes to avoiding the loss of sealability of the storage box.

Finally, since the electric interconnection can be established with separated parts for the bodywork-side and the seat-side, the wiring can be easily joined and disjoined when it is assembled into and disassembled from the bodywork. Further, since the wiring can be assembled and disassembled with the illuminating lamp mounted, this configuration is effective in providing improvement in the work efficiency and maintenance of the electric wiring.

What is claimed is:

1. A storage box illuminator for a motorcycle wherein a storage box having a top opening is arranged under the seat so that the bottom plate of the seat can cover the opening in an openable and closable manner, the illuminator comprising:

an illuminating device for illuminating the inside of the storage box; and a depressed portion which is formed on the underside of the seat bottom plate of the seat and indented upward approximately as deep as the height of the illuminating device, characterized in that the illuminating device is arranged inside the depressed portion so that the illuminating device can illuminate the inside of the storage box when the seat is set open.

2. The storage box illuminator for a motorcycle according to claim 1, further comprising:

wiring cord holders provided on the undersurface of the seat bottom plate for leading the wiring cord from the illuminating device to the outside of the storage box; and a sealing element arranged on the underside of the seat bottom plate opposing the opening of the storage box, wherein the wiring cord is arranged on the underside of the seat covering the storage box in an openable and closable manner and extended along the wiring cord holders, and a pair of passage holes are formed in the seat bottomplate at positions on the inner and outer sides of the opening of the storage box so that the wiring cord is arranged passing through these passage holes to bypass the sealing element.

3. The storage box illuminator for a motorcycle according to claim 1, characterized in that:

the seat has a seat hinge portion at the front part thereof and is supported on the bodywork by the seat hinge portion so that the seat can open and close the opening of the storage box by being pivoted vertically;

the wiring cord is arranged from the illuminating device to the power supply on the bodywork, passing by the seat hinge portion at the front part of the seat, and is comprised of a body-side wiring part extended from the power supply on the body side and a seat-side wiring part arranged from the illuminating device on the underside of the seat bottom plate along the seat bottom plate so that they can be joined and disjoined at a joining portion; and the joining portion between the body-side wiring part and seat-side wiring part of the wiring cord is disposed at the seat hinge portion on the bodywork side.

4. The storage box illuminator for a motorcycle according to claim 2, characterized in that:

the seat has a seat hinge portion at the front part thereof and is supported on the bodywork by the seat hinge portion so that the seat can open and close the opening of the storage box by being pivoted vertically;

the wiring cord is arranged from the illuminating device to the power supply on the bodywork, passing by the seat hinge portion at the front part of the seat, and is comprised of a body-side wiring part extended from the power supply on the body side and a seat-side wiring part arranged from the illuminating device on the underside of the seat bottom plate along the seat bottom plate so that they can be joined and disjoined at a joining portion; and the joining portion between the body-side wiring part and seat-side wiring part of the wiring cord is disposed at the seat hinge portion on the bodywork side.

* * * * *